(12) United States Patent
Iwai

(10) Patent No.: US 9,704,484 B2
(45) Date of Patent: Jul. 11, 2017

(54) SPEECH RECOGNITION METHOD AND SPEECH RECOGNITION DEVICE

(71) Applicant: HONDA ACCESS CORP., Niiza-shi, Saitama (JP)

(72) Inventor: Shiro Iwai, Niiza (JP)

(73) Assignee: HONDA ACCESS CORP., Niiza-shi, Saitama (JP)

( * ) Notice: Subject to any disclaimer, the term of this patent is extended or adjusted under 35 U.S.C. 154(b) by 15 days.

(21) Appl. No.: 14/420,587

(22) PCT Filed: Aug. 9, 2013

(86) PCT No.: PCT/JP2013/071649
§ 371 (c)(1),
(2) Date: Feb. 9, 2015

(87) PCT Pub. No.: WO2014/025012
PCT Pub. Date: Feb. 13, 2014

(65) Prior Publication Data
US 2015/0206535 A1   Jul. 23, 2015

(30) Foreign Application Priority Data

Aug. 10, 2012   (JP) ................................. 2012-178701

(51) Int. Cl.
*G10L 15/25*   (2013.01)

(52) U.S. Cl.
CPC .................................. *G10L 15/25* (2013.01)

(58) Field of Classification Search
CPC ....................................................... G10L 15/25
See application file for complete search history.

(56) References Cited

U.S. PATENT DOCUMENTS

| | | | |
|---|---|---|---|
| 5,884,257 A * | 3/1999 | Maekawa ............... | G10L 25/87 381/110 |
| 6,556,968 B1 * | 4/2003 | Shiono .................... | G10L 15/20 704/226 |
| 6,754,373 B1 * | 6/2004 | de Cuetos .......... | G06K 9/00335 382/118 |

(Continued)

FOREIGN PATENT DOCUMENTS

| | | |
|---|---|---|
| JP | 11-352987 A | 12/1999 |
| JP | 2009-25579 A | 2/2009 |
| JP | 4754294 B2 | 8/2011 |

OTHER PUBLICATIONS

Notification of Transmittal of Translation of the International Preliminary Report on Patentability (Form PCT/IB/338) of International Application No. PCT/JP2013/071649 mailed Feb. 19, 2015 with Forms PCT/IB/373 and PCT/ISA/237 (6 pages).

(Continued)

*Primary Examiner* — Brian Albertalli
(74) *Attorney, Agent, or Firm* — Westerman, Hattori, Daniels & Adrian, LLP

(57) ABSTRACT

Provided is a speech recognition device that executes a speech recognition method capable of improving speech recognition accuracy. The speech recognition device includes a trigger generation unit for generating a trigger signal on the basis of at least mouth movement and a speech recognition unit which extracts a sound signal on the basis of the trigger signal and starts speech recognition for speech in the extracted sound signal. When the trigger generation unit is generating a trigger signal solely on the basis of opening of the mouth, the trigger generation unit generates the trigger signal so as to precede the opening of the mouth by a predetermined period. Alternatively, when the trigger generation unit is generating a trigger signal on the basis of opening of the mouth and changes in eye orientation, the trigger generation unit generates the trigger signal from the moment any of the above occurs.

13 Claims, 4 Drawing Sheets

(56) References Cited

U.S. PATENT DOCUMENTS

| | | | | |
|---|---|---|---|---|
| 7,219,062 B2* | 5/2007 | Colmenarez | ............ | G10L 15/24 382/100 |
| 8,700,392 B1* | 4/2014 | Hart | ............ | G10L 15/25 704/231 |
| 9,263,044 B1* | 2/2016 | Cassidy | ............ | G06K 9/00 |
| 9,318,129 B2* | 4/2016 | Vasilieff | ............ | G10L 25/78 |
| 2002/0035475 A1* | 3/2002 | Yoda | ............ | G10L 15/24 704/270 |
| 2002/0105575 A1* | 8/2002 | Hinde | ............ | G10L 15/24 348/14.01 |
| 2003/0018475 A1* | 1/2003 | Basu | ............ | G06K 9/00228 704/270 |
| 2003/0171932 A1* | 9/2003 | Juang | ............ | G10L 15/24 704/276 |
| 2004/0117191 A1* | 6/2004 | Seshadri | ............ | G10L 15/25 704/275 |
| 2007/0136071 A1* | 6/2007 | Lee | ............ | G10L 15/25 704/270 |
| 2008/0037837 A1* | 2/2008 | Noguchi | ............ | G06K 9/00335 382/118 |
| 2010/0121636 A1* | 5/2010 | Burke | ............ | G06F 3/0346 704/233 |
| 2011/0238191 A1* | 9/2011 | Kristjansson | ............ | G06F 1/1626 700/94 |
| 2011/0257971 A1* | 10/2011 | Morrison | ............ | G06K 9/00221 704/233 |
| 2012/0259638 A1* | 10/2012 | Kalinli | ............ | G10L 15/25 704/270 |
| 2013/0080178 A1* | 3/2013 | Kang | ............ | G06F 3/167 704/275 |
| 2013/0085757 A1* | 4/2013 | Nakamura | ............ | G10L 15/22 704/254 |
| 2015/0109191 A1* | 4/2015 | Johnson | ............ | G10L 15/22 345/156 |
| 2015/0161992 A1* | 6/2015 | Jung | ............ | G10L 15/083 704/251 |

OTHER PUBLICATIONS

International Search Report dated Septermber 3, 2013, issued in corresponding application No. PCT/JP2013/071649.

* cited by examiner

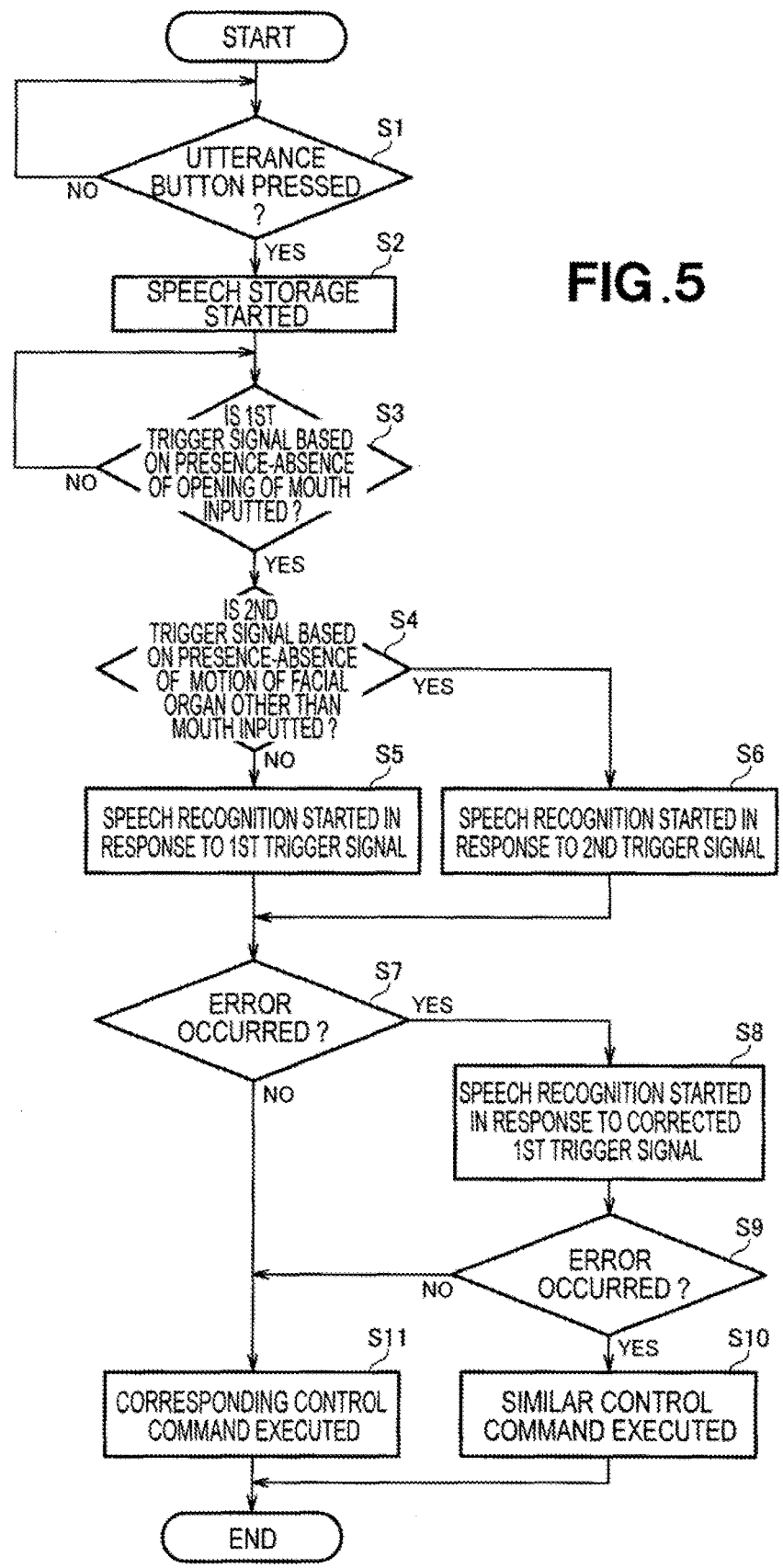

SPEECH RECOGNITION METHOD AND SPEECH RECOGNITION DEVICE

TECHNICAL FIELD

The present invention relates to a speech recognition method and a speech recognition device.

BACKGROUND ART

Vehicles such as automobiles carry electrical equipment such as door mirrors and navigation systems. Such electrical equipment can include a speech recognition device and can be operated by a driver verbally. According to the disclosure of Patent Literature 1, for example, an image recognition circuit judges the presence-absence of the opening/closing motions of a driver's mouth by means of image recognition. A door mirror control circuit disclosed therein is arranged to permit mirror face angular adjustment with respect to the contents of the instructions to be analyzed by a speech recognition circuit during a time period in which the opening/closing motion of the driver's lips was judged to have been present by the image recognition circuit and to inhibit mirror face angular adjustment with respect to the contents of the instructions to be analyzed by the speech recognition circuit during the time period in which the opening/closing motion of the driver's lips was judged to have been absent by the image recognition circuit. With this arrangement, it is possible to prevent the mirror face angular adjustment from being effected by malfunction associated with voices of a co-passenger other than the driver or noises.

According to the disclosure of Patent Literature 1, the door mirror control circuit is arranged to invalidate the results (contents of instructions for mirror face angular adjustment) of the speech recognition when the presence-absence of opening of the mount is indicated "absent". Consequently, when the image recognition circuit recognizes speech unassociated with the motion of the mouth, it makes the judgment of "no utterance", whereby accuracy of speech recognition is deteriorated.

PRIOR ART LITERATURE

Patent Literature

Patent Literature 1: Japanese Patent No. 4754294

SUMMARY OF INVENTION

It is an object of the present invention to provide a speech recognition method and a speech recognition device that enable speech recognition with improved accuracy. Another object of the present invention will become apparent to a person skilled in the art when reference is made to the following preferred embodiments in conjunction with the accompanying drawings.

Certain preferred embodiments of the present invention will be described below, by way of example only, below for readily understanding of the invention summarily.

According to a first aspect of the present invention, there is provided a speech recognition device comprising: a trigger generation section for generating a trigger signal based on at least a condition of present-absent of opening of a mouth; and a speech recognition section for, in response to the trigger signal, taking in audio signals and starting speech recognition relative to the audio signals taken in, wherein, when the trigger generation section generates the trigger signal based solely on the condition of present-absent of opening of the mouth, the trigger generation section generates the trigger signal for a predetermined time duration retroactively from a time point at which the condition of present-absent of opening of the mouth is present, and, when the trigger generation section generates the trigger signal based on conditions of the present-absent of opening of the mouth and present-absent of a change in a view direction of eyes, and/or present-absent of a change in an orientation of a face, the trigger generation section generates the trigger signal when one of the present-absent conditions is present.

The present inventor has recognized that certain persons make utterances without moving their mouths. In the first aspect, the trigger generation section generates the trigger signal for the predetermined time duration retroactively from the time point at which the opening of the mouth was present, or based on not only the opening of the mouth but also the change in the view line of the eyes and/or the change in the orientation of the face. Such a trigger signal enables acquisition of speech unassociated with the motion of the mouth, which existed before the speech associated with the motion of the mouth as well as performance of speech recognition with the acquired speech included, whereby accuracy of speech recognition is improved.

Further, by using the trigger signal that specifies time duration in which to perform speech recognition with respect to audio signals, it becomes unnecessary to perform speech recognition with respect to audio signals in all time durations. In other words, speech recognition may be performed only with respect to the audio signals sorted out by the trigger signal. Consequently, the processing upon the speech recognition can be reduced.

In the first aspect, preferably, the speech recognition section performs in advance the speech recognition based only on the condition of present-absent of opening of the mouth, using the trigger signal in advance and, when the outcome of the speech recognition by the speech recognition section indicates an error, corrects the trigger signal. The corrected trigger signal may comprise a trigger signal that is generated for the predetermined time duration retroactively from the time point at which the condition of present-absent of opening of the mouth is present.

When the outcome of the speech recognition indicates an error, the speech recognition section corrects the trigger signal. Thus, when the outcome of the speech recognition does not indicate an error, the speech recognition section soon performs the speech recognition using the non-corrected trigger signal (i.e., based on only present-absent of opening of the mouth), or ends the speech recognition.

According to a second aspect of the present invention, there is provided a speech recognition device comprising: a trigger generating section for generating a trigger signal based on at least a condition of present-absent of opening of a mouth; and a speech recognition section for, in response to the trigger signal, taking in audio signals and starting speech recognition relative to the audio signals taken in, wherein, when an outcome of the speech recognition by the speech recognition section indicates an error, the speech recognition section generates the trigger signal for a predetermined time duration retroactively from a time point at which the condition of present-absent of opening of the mouth is present, and restart the speech recognition with the trigger signal.

When the outcome of the speech recognition does not show any error, the speech recognition section soon performs the speech recognition using the non-corrected trigger signal (i.e., based on only present-absent of opening of the mouth), or ends the speech recognition.

According to a third aspect of the present invention, there is provided a speech recognition method comprising the steps of: generating a trigger signal based on motion of a first facial organ and motion of a second facial organ different from the first facial organ; and starting speech recognition relative to audio signals in response to the trigger signal, wherein the first facial organ is a mouth.

Generally, humans utter consonants, such as "la", "li" and "lu" and so forth of Japanese language and "b", "c", "d" and so forth of English language, of arbitrary languages with their mouths opened smaller than when they utter vowels. Further, certain persons speak with their mouths opened only slightly. Consequently, if speech recognition is carried out based only on the motion of a mouth, speech unassociated with the motion of the mouth cannot be recognized. The present inventor has recognized that before a person utter, his facial organs different from his mouth, such as his eyes, face and eyebrows, move and has come to invent the speech recognition method wherein during the course of generation of the trigger signal, a facial organ (second facial organ) other than the mouth (first facial organ) is taken into consideration.

In the third aspect, the trigger signal is generated in such a manner as to be based also on the motion of a facial organ (2nd facial organ) other than the mouth (1st facial organ). As a result, the speech in the duration unassociated with the motion of the mouth can also be recognized, whereby speech recognition rate or accuracy will be improved.

By using the trigger signal that specifies time duration in which to perform speech recognition relative to audio signals, it becomes unnecessary to perform speech recognition with respect to audio signals in all time durations. In other words, speech recognition may be carried out only with respect to audio sounds sorted or cut out by the trigger signal. As a result, processing required for speech recognition can be reduced.

In the third aspect, preferably, the second facial organ may be an eye and/or a face.

The present inventor has perceived that some persons are highly likely to utter in association with the motion of their eyes among various facial organs. The present inventor has also noticed that persons utter in association with the motion of their faces among various facial organs. Owing to generation of the trigger signal based on the motion of the eyes and the motion of the faces, speech recognition accuracy can be improved.

In the third aspect, preferably, the motion of the mouth is present-absent of opening of the mouth, the motion of the eye is present-absent of a change in a view direction of the eye, and the motion of the face is present-absent of a change in an orientation of the face.

The present inventor has noticed that when a person gazes at something and hear someone speak, changes are likely to occur in the view directions of his eyes and in the orientations of his face, and that he is highly likely to utter in such timing. Generation of the trigger signal, utilizing such general characteristics of such a person, speech recognition can be further improved in accuracy.

According to a fourth aspect of the present invention, there is provided a speech recognition method comprising the steps of; generating a trigger signal based on a condition of present-absent of motion of a mouth; taking in audio signals in response to the trigger signal and starting speech recognition relative to the audio signals taken in, wherein the trigger signal is generated from a predetermined time duration retroactively from a point in time at which the condition of present-absent of motion of the mouth is present.

The present inventor has recognized that certain persons utter without moving their mouths. In the third aspect, the trigger signal is generated for the predetermined time duration retroactively from the time point at which the condition of present-absent of the motion of the mouth was present. As a result, it becomes possible to take in or acquire speech which is not associated with the motion of the mouth and existed before the speech associated with the motion of the mouth and to perform speech recognition with respect to the speech including the speech taken in, whereby accuracy of the speech recognition can be improved.

By utilizing the trigger signal that specifies time duration at which to start the speech recognition, it is not necessary to carry out speech recognition relative to audio signals in all time durations. In other words, speech recognition may sufficiently be performed with respect to only the audio signals sorted or cut out by the trigger signal. As a result, the processing required for the speech recognition can be reduced.

In the fourth aspect, desirably, when the speech recognition indicates an error, the trigger signal is generated for the predetermined time duration retroactively from the time point at which the condition of present-absent of motion of the mouth is present.

Preferably, when the outcome of the speech recognition indicates an error, the trigger signal may be generated for the predetermined time duration retroactively from the time point at which the present-absent of the motion of the mouth is present.

When the outcome of the speech recognition does not show an error, the speech recognition may be performed or finished using a non-corrected trigger signal (i.e., only present-absent of opening of the mouth).

According to a fifth aspect of the present invention, there is provided a speech recognition method comprising the steps of; generating a trigger signal from a point in time at which a condition of present-absent of motion of a mouth is present; taking in audio signals in response to the trigger signal and starting speech recognition relative to the audio signals taken in; and judging whether an outcome of the speech recognition indicates an error, wherein, when the outcome of the speech recognition indicates an error, the trigger signal is generated for a predetermined time duration retroactively from a time point at which the condition of present-absent of motion of the mouth is present, and the speech recognition is restarted in response to the trigger signal.

When the outcome of the speech recognition does not show an error, the speech recognition may be performed or finished using a non-corrected trigger signal (i.e., only present-absent of opening of the mouth).

It will be readily appreciated by one skilled in the art that the embodiments of the present invention may be further modified without departing from the spirits of the present invention.

BRIEF DESCRIPTION OF THE DRAWINGS

FIG. 5 is a flowchart illustrating example operations of the electrical equipment.

MODE FOR CARRYING OUT THE INVENTION

The best mode discussed below will be used for easy understanding of the present invention. It should therefore be appreciated by a person skilled in the art that the present invention may not be construed as being limited to the below-discussed mode.

Figure 1:
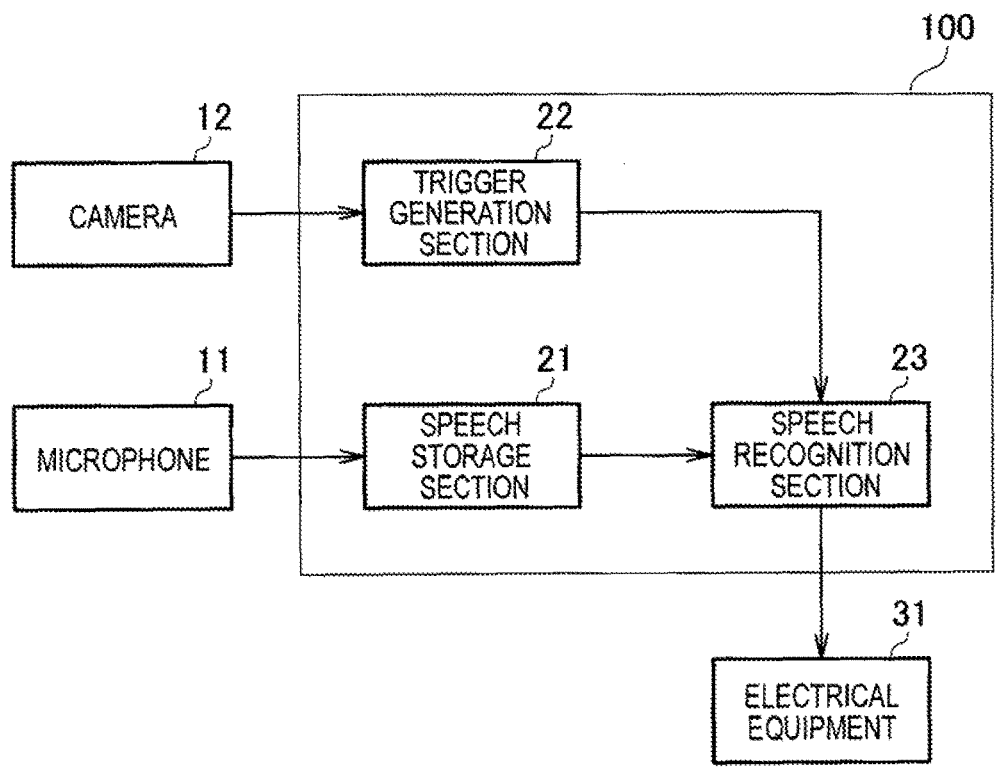
FIG. 1 is a block diagram illustrating an example arrangement of a speech recognition device for executing a speech recognition method according to the present invention.

FIG. 1 illustrates an example arrangement of a speech recognition device for executing a speech recognition method in accordance with the present invention. The speech recognition device 100 shown in FIG. 1 comprises a trigger generation section 22 and a speech recognition section 23. During generation of a trigger signal that causes speech recognition to start with respect to sound or audio signals obtained by, e.g., a microphone 11, the trigger generation section 22 utilizes video signals obtained synchronizably with the sound signals by, e.g., a camera 12. The trigger generation section 22 retrieves a facial organ such as a mouth from each video in the video signals, recognizes the motion of the facial organ, and generates a trigger signal on the basis of the motion of the facial organ.

The speech recognition device 100 shown in FIG. 1 may further include a speech storage section 21 for storing, e.g., sound signals. The speech recognition section 23 is capable of receiving the sound signals temporarily stored in the speech storage section 21 on the basis of the trigger signal retroactively for a predetermined duration of time. In the speech recognition device 100, the speech recognition section 23 may be arranged to receive the sound signals directly from the microphone 11, with the speech storage section 21 omitted.

The trigger generation section 22 and the speech recognition section 23 may be provided in the form of a single microcomputer, for example. A Read Only Memory (ROM) in the microcomputer may store programs (data) for causing the trigger generation section 22 and the speech recognition section 23 to execute the respective processing while a Random Access Memory (RAM) in the microcomputer may store data for executing the respective programs. The speech storage section 21 may be formed of a flash memory, for example. The ROM, RAM and flash memory may be provided in the form of a single storage section and various signals and data may be stored in that storage section. The speech recognition device 100 may be formed of a single electronic control unit which includes one microcomputer, one flash memory, an input-output interface, and so forth. The electrical equipment 31 may also be formed of a single electronic control, for example. Note that the electrical equipment 31 and the speech recognition device 100 may be formed by the single electronic control unit.

The trigger generation section 22 shown in FIG. 1 generates a trigger signal on the basis of at least the present-absent of opening of the mouth. In response to the trigger signal, the speech recognition section 23 takes in sound signals and begins the speech recognition relative to the sound signals taken in. The speech storage section 21 stores the sound signals.

When the trigger generation section 22 generates a trigger signal based solely on the present-absent of opening of the mouth, the trigger generation section 22 generates a trigger signal for a predetermined duration of time retroactively from the point when the present-absent of opening of the mouth is "present". Alternatively, when the trigger generation section 22 generates a trigger signal on the basis of the present-absent of opening of the mouth, the present-absent of a change in sight or view direction of eyes and/or the present-absent of a change in direction or orientation of a face, the trigger generation section 22 starts generating a trigger signal from the point when one of the present-absent conditions is "present".

The trigger generation section 22 is designed to generate a trigger signal by at least one kind of speech generation method. Specifically, only one program that can execute one kind of speech recognition method is pre-installed in the speech recognition device 100 so that the trigger generation section 22 generates a trigger signal by the one kind of speech recognition method. The one kind of speech recognition method may be one of a first speech recognition method and a second speech recognition method, which are discussed below. Alternatively, programs that can execute two kinds of speech recognition methods may be pre-installed in the speech recognition device 100 so that the trigger generation section 22 can select one of the two kinds of speech recognition methods and generate a trigger signal by the selected speech recognition method. Each speech recognition method may be one of the first speech recognition method and the second speech recognition method discussed below.

The first speech recognition method of the mentioned two kinds of speech recognition methods includes generating a trigger signal on the basis of present-absent of the motion of the mouth and taking in sound signals in response to the trigger signal and starting speech recognition relative to the sound signals taken in. The trigger signal is generated retroactively for a predetermined duration from the point when the present-absent of the motion of the mouth is "present". The second speech recognition method of the above-mentioned two kinds of speech recognition methods includes generating a trigger signal on the basis of the motion of a first facial organ and the motion of a second facial organ different from the first facial organ, e.g., eyes and face, and starting the speech recognition with respect to the sound signals in response to the trigger signal.

Figure 2:
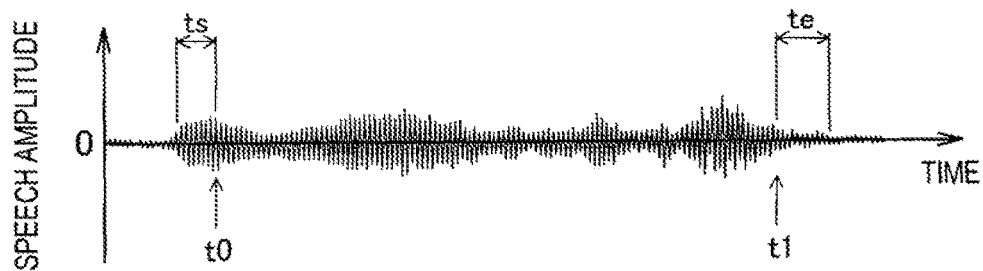
FIG. 2 illustrates a duration of time in which a trigger signal corresponding to a sound signal stored in a speech storage section of FIG. 1 is generated.

As shown in FIG. 2, the present inventor recognized that there is a person who can make speech without moving his mouth or lips. In the present invention, a trigger signal is generated for a duration backward from the presence of the motion of the mouth. Otherwise, a trigger signal is generated on the basis of not only the mouth motion but also the motion of other facial organs. Owing to such trigger signals, it becomes possible to take in or fetch sounds unassociated with the motion of the mouth, which are older than sounds associated with the mouth motion, and to achieve speech recognition with increased precision.

The speech recognition device 100 and the speech recognition method to be executed by the speech recognition device 100 may be applied to various machines and instruments and may be applied advantageously to an electrical equipment 31 such as a navigation system, for example. The electrical equipment 31 can execute a variety of controls on the basis of speech recognized by the speech recognition device 100. For example, the navigation system can execute an operation such as an address search in accordance with the speech of a driver. Note that the present invention is not limited to application to the navigation system and may be applied to various machines and instruments wherein the speech recognition device 100 and the speech recognition method to be executed by the speech recognition device 100 are mounted for achieving speech recognition with improved precision.

The speech recognition device 100 shown in FIG. 1 is not equipped with a microphone such as the one 11. However, a speech acquisition section such as the microphone 11, for example, may be integrated into the speech recognition device 100. Similarly, although the speech recognition device 100 is not equipped with a camera such as the one 12, a video acquisition section such as the camera 12 may be integrated into the speech recognition device 100.

FIG. 2 is an example illustration of a duration of time in which a trigger signal corresponding to a sound signal stored in the speech storage section 31 of FIG. 1 is generated. As shown in FIG. 2, the sound signals stored in the speech storage section 21 are shown in waveforms. The sound signals obtained by the microphone 11 of FIG. 1 are synchronized with the video signals obtained by the camera 12. Stated otherwise, the time of the sound signals coincide with the time of the video signals. As shown in FIG. 2, the sound signals include not only speech sounds but also noises.

As shown in FIG. 2, the trigger generation section 22 of FIG. 1 determined at time t0 the motion of the mouth (for example, mouth opening) from the video signals and judged the mouth opening to have lasted until time t1. Namely, time t0 is the time that stands for a start point of a duration of time of speech associated with the motion of the mouth while time t1 is the time that stands for an end point of the speech duration associated with the mouth motion. When the trigger generation section 22 generates a trigger signal based solely on the present-absent of the mouth motion, in one known mode, the trigger signal (first trigger signal) exhibits zero or "low" up to time to, for example, "1 or "High" between time t0 and time t1, and zero or "low" after time t1.

However, certain persons utter with their mouths opened only slightly, or even without moving their mouths at all, as shown in FIG. 2. The present inventor has recognized that even when the mouth motion is not specified at the trigger generation section 22, there exists before time t0 a speech duration ts which is not associated with the mouth motion. The trigger signal (first trigger signal) in the one known mode exhibits "1 or High" only for the duration of time between time t0 and time t1. In other words, with the trigger signal (first trigger signal) in the one known mode, which exhibits only "1 or High" for the duration of time of t0 to t1, it is possible to recognize speech in the duration of t0 to t1 but not possible to recognize speech in the duration of time of speech ts. Similarly, when there exists after time t1 a duration of time of speech te which is not associated with the motion of the mouth, it is not possible to recognize speech included in the duration of time of speech te. Thus, with the trigger signal (first trigger signal) in the one known mode, deterioration of precision of speech recognition is inevitable.

To this end, in the first speech recognition method according to the present invention, the trigger signal (corrected first trigger signal) is generated retroactively for a predetermined duration of time from time t0 when the present-absent of the motion of the mouth is "present". The predetermined duration of time is set to include the duration of time of speech ts and may be 2-3 seconds, for example. In other words, when the present-absent of the motion of the mouth in the duration of time of t0 to t1 is "present", the trigger signal (corrected first trigger signal) that exhibits "1 or High" is generated from, e.g., 2-3 seconds before time t0. Similarly, the trigger signal (corrected first trigger signal) that exhibits "zero or Low" may be generated when there exists a delay of predetermined time period from the time t1 when the present-absent of the motion of the mouth is "present". That is, the trigger signal (corrected trigger signal) that exhibits "1 or High" for a duration of time from, e.g., 2-3 seconds before time t0 up to, e.g., 2-3 seconds after time t1 may be generated. By taking in at least speech signals in the period 2-3 seconds before time t0 and performing speech recognition with respect to the fetched sound signals, it becomes possible to recognize phonems such as consonants (e.g., Japanese "la" and English "b") in the duration of time of speech ts, whereby precision of speech recognition is improved. Similarly, speech signals in the period 2-3 seconds after time t1 are taken in and speech recognition is performed with respect to the fetched sound signals.

In the second speech recognition method according to the present invention, the trigger signal (second trigger signal) is generated such that the duration of the trigger signal (second trigger signal) exhibiting "1 or High" is set to include the duration of time of speech ts. Namely, when the duration of time ts in which the present-absent of the motion of the mouth is "absent" includes "present" of the present-absent of the motion of a facial organ other than the mouth, e.g. eyes, the generated trigger signal (second trigger signal) exhibits "1 or High". Similarly, the trigger signal (second trigger signal) may be generated such that the duration of time of speech te is included in the duration of time exhibiting "1 or High". When the present-absent of the motion of, e.g., eyes, in the duration of time of speech te is "present", the generated trigger signal (second trigger signal) exhibits "1 or High". Note that not only the present-absent of the motion of the eyes but also the present-absent of the motion of a face may be taken into consideration. In place of the present-absent of the motion of the eyes, the present-absent of the motion of the face may be taken into consideration. By virtue of the trigger signal generated on the basis of both the motion of the first facial organ, namely, the mouth and the motion of the second facial organ, e.g., eyes and face, the speech recognition section 23 can recognize phonems such as consonants in the duration of time of speech ts, te, whereby precision of speech recognition is improved also by the trigger signal (second trigger signal) in the second speech recognition method.

Note that in another known mode such as the one performed in the speech recognition circuit of Patent Literature 1, speech recognition is carried out as to audio signals in all durations of time, not audio signals in a specific duration of time.

Utilized in the first and second speech recognition methods is the trigger signal (corrected first trigger signal or corrected second trigger signal) that sets the starting point for speech recognition with respect to the audio signals. As a result, it becomes unnecessary to perform speech recognition relative to the audio signals in all durations of time. Stated otherwise, speech recognition is required to be performed only on the audio signals sorted out by the trigger signals (corrected first or second trigger signal), with the result that in the first and second speech recognition methods, the load of speech recognition can be reduced.

Figure 3:
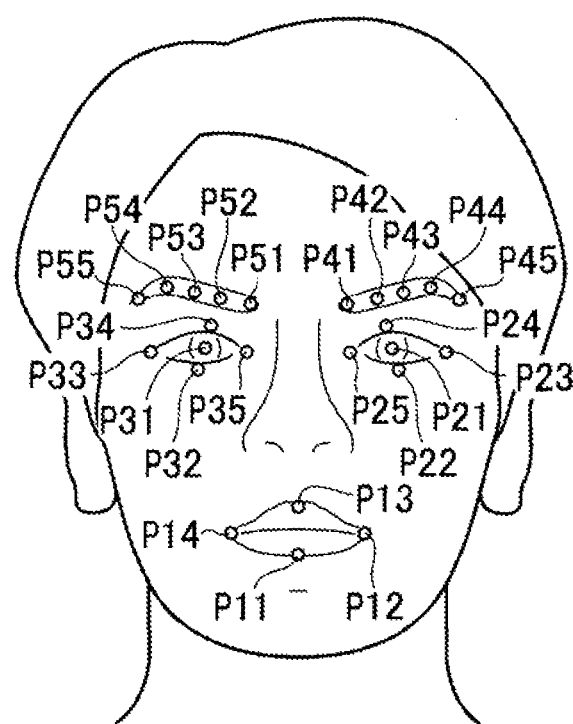
FIG. 3 is a view illustrating example feature points for determining the motion of facial organs.

FIG. 3 is a schematic illustration of example feature points for determining motions of facial organs. The camera 12 shown in FIG. 1 is installed in such a manner as to capture a picture of a face of driver, etc., and may be mounted to, for example, an inner mirror, sun visor, an instrument panel and a roof lining within a passenger compartment. Thus, when the driver sits in a driver's seat toward the front (direction of forward travel of a vehicle), the camera 12 can take a facial image of the driver. As shown in FIG. 3, the camera 12 captures the image of the front face.

The trigger generation section 22 of FIG. 1 is capable of video recognition of facial feature points P as shown in FIG. 3. More specifically, the trigger generation section 22 (video recognition section) sorts out or defines a human facial region or profile from each frame (video) of the video signals. As shown in FIG. 3, the trigger generation section 22 extracts or retrieves facial organs such as a mouth region, an eye region and an eyebrow region and picks out feature points P11, P12, P13, and P14 for the mouth region, feature points P21, P22, P23, P24, P25, P31, P32, P34 and P35 for the eye region, and feature points P41, P42, P43, P44, P45, P51, P52, P54 and P55 for the eyebrow region.

The trigger generation section 22 determines motion of the mouth on the basis of the four feature points P11, P12, P13 and P14 and judges the present-absent of opening of the mouth. When the present-absent of opening of the mouth is "present", the trigger signal (second trigger signal) exhibits "1 or High". When the trigger signal (corrected first trigger signal) is generated solely on the present-absent of opening of the mouth, the corrected first trigger signal exhibits "1 or High" from the point in time 2-3 seconds before the exhibition of the trigger signal (uncorrected first trigger signal) is changed from "0 or Low" to "1 or High".

When the trigger generation section 22 takes into consideration not only the motion of the mouth but also the motion of the eyes, the trigger generation section 22 determines the motion of the eyes from, for example, the ten feature points P21, P22, P23, P24, P25, P31, P32, P34, P35 and judges the present-absent of opening of the eyes. When one of the present-absent of opening of the mouth and the present-absent of a change in the view direction of the eyes is "present", the trigger signal (second trigger signal) exhibits "1 or High".

The trigger generation section 22 may judge the present-absent of the motion or movement of the eyebrows but rather be arranged to generate the trigger signal (second trigger signal) on the basis of the present-absent of a change in the view direction of the eyes in place of the present-absent of the motion of the eyebrows so as to increase the probability of fetching speech unassociated with the motion of the mouth.

In addition, the trigger generation section 22 can specify the motion of the face on the basis of the positions of the mouth region and the eye region in the face region and judge the present-absent of a change in the orientation of the face. Similarly to the present-absent of the change in the view direction of the eyes, the present-absent of the change in the orientation of the face increases probability of fetching of speech not associated with the motion of the mouth. When one of the present-absent of opening of the mouth and the present-absent of a change in the orientation of the face is "present", the trigger signal (second trigger signal) exhibits "1 or High". Or, when one of the present-absent of opening of the mouth, the present-absent of the change in the view line of the eyes and the present-absent of the change in the orientation of the face is "present", the trigger signal (second trigger signal) exhibits "1 or High".

When the trigger generation section 22 generates the trigger signal (corrected first trigger signal or corrected second trigger signal) and the audio signals in the duration in which the trigger signal (corrected first trigger signal or corrected second trigger signal) exhibits "1 or High" are subjected to speech recognition by the speech recognition section 23, phonems in the speech can be recognized in accordance with acoustic model with increased precision. Thereafter, the speech recognition section 23 specifies words and sentences from the recognized phonems in accordance with language model and sends out resulted character data to, e.g., the electrical equipment 31. The electrical equipment 31 judge whether the character data match predetermined control commands, whereby an operator such as the driver can operate the electrical equipment 31 verbally.

Figure 4:
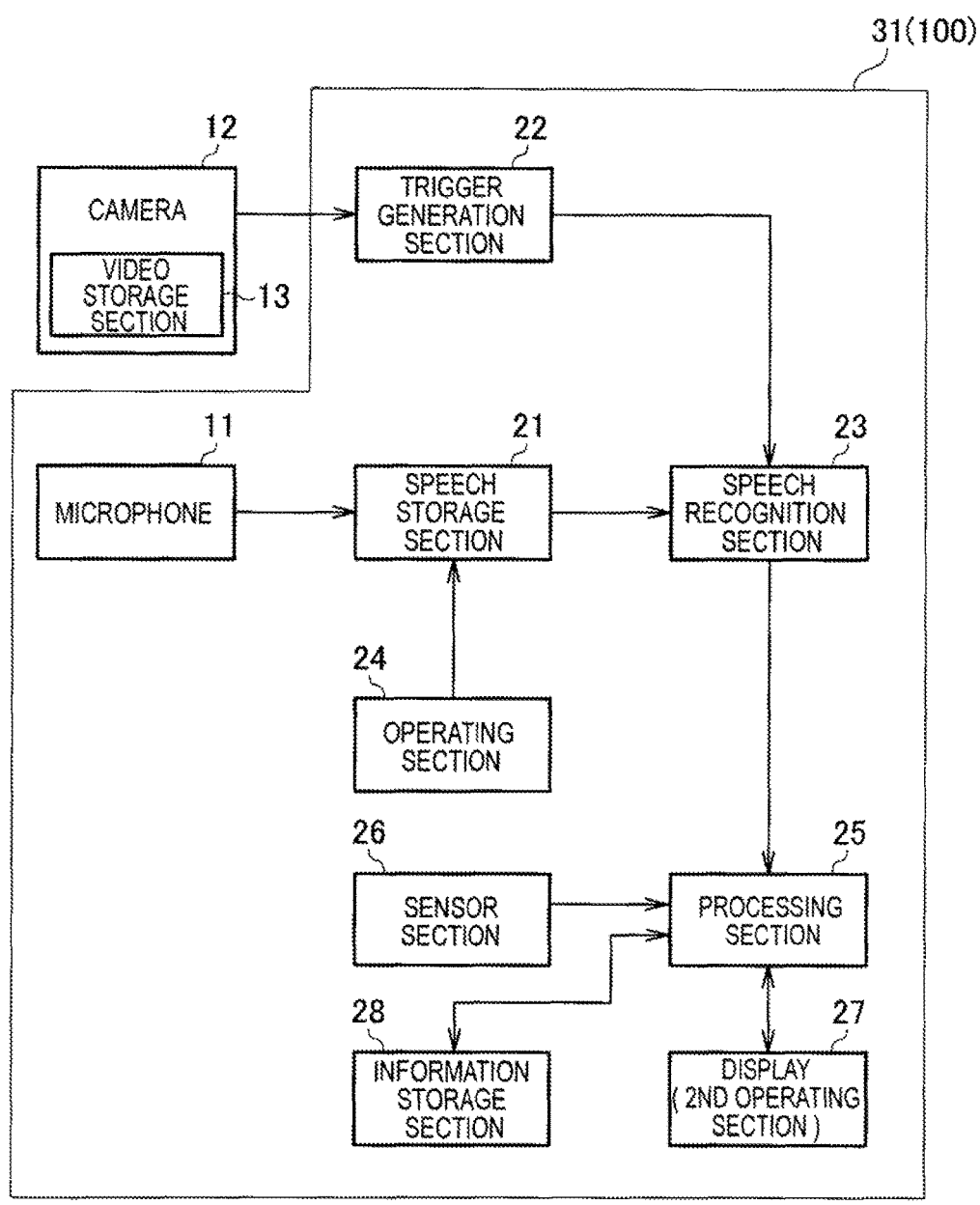
FIG. 4 is a block diagram illustrating an example arrangement of a speech recognition device as an electrical equipment for executing a speech recognition according to the present invention.

FIG. 4 illustrates an example arrangement of the electrical equipment which serves as the speech recognition device for executing the speech recognition method in accordance with the present invention. Similarly to the speech recognition device 100 of FIG. 1, the electrical equipment 31 shown in FIG. 4 includes the trigger generation section 22 and a speech recognition section 23. The electrical equipment 31 of FIG. 4 is a modification of the electrical equipment 31 of FIG. 1 and includes the speech recognition device 100 of FIG. 1 and the microphone 11 of FIG. 1.

As shown in FIG. 4, the camera 12 includes a video storage section 13 which stores video signals synchronized with audio signals from the microphone 11. While the camera 12 is placed in operation, the video storage section 13 can normally store the video signals acquired by the camera 12. The video signals stored in the video storage section 13 include a plurality of frames (videos).

The electrical equipment 31 of FIG. 4 is equipped with the microphone 11 and may further includes an operating section 24, a processing section 25, a sensor section 26, a display section 27 and an information storage section 28. Similarly to the speech recognition device 100, the electrical equipment 31 of FIG. 4 may not include the microphone 11. Note also that the electrical equipment 31 of FIG. 4 may not include any or all of the operating section 24, the processing section 25, the sensor section 26, the display section 27 and the information storage section 28. An example operation of the speech recognition section 23 will be explained below.

FIG. 5 is a flowchart illustrating an example operation of the electrical equipment of FIG. 4. In FIG. 5, "start" indicates the time when the electrical equipment 31 is switched ON. The electrical equipment 31 of FIG. 4 may be a navigation system, for example. With operational information inputted by a human user, the driver, the operating section 24 outputs the operational information to the speech storage section 21. Specifically, the operating section 24 is an utterance button, for example, and the speech storage section 21 is capable of judging whether the utterance button has been pressed (Step S1 of FIG. 5).

When the driver desires to drive a vehicle to a certain destination, it is necessary for the driver to input the destination in the navigation system as the electrical equipment 31. When the driver performs an operation such as an address search verbally, the driver presses the utterance button as the operating section 24. After the utterance button is pressed, the speech storage section 21 can store speech of the driver (Step S2 of FIG. 5). The speech storage section 21 may start storing the speech of the driver regardless of the operational information from the operating section 24. Namely, the electrical equipment 31 may not have the operating section 24 while, when the electrical equipment 31 is activated, the speech storage section 21 may start speech storage regardless of the operational information from the operating section 24.

When the camera 12 of FIG. 4 is activated, the video storage section 13 of the camera 12 starts storing video signals comprised of a plurality of frames (images). Note also that when an activation signal is inputted from the electrical equipment 31, for example, the video storage section 13 may start storing video signals (images). Trigger generation section 22 of FIG. 4 retrieves a facial organ such as a mouth out from each image in the video signals recognizes the motion of the facial organ and generates, e.g., a first or second trigger signal on the basis of the motion of the facial organ.

The trigger generation section 22 extracts at least the present-absent of opening of the mouth and, from the time when the present-absent of opening of the mouth is "present", generates the first trigger signal that exhibits "1 or High" and outputs the first trigger signal to the speech recognition section 23. The trigger generation section 22 may extract the present-absent of a change in the direction of view of the eyes and/or the present-absent of a change in the orientation of the face. When the present-absent of, e.g., the change in the view direction of the eyes is "presence, the trigger generation section 22 generates at that instance only a second trigger signal that exhibits "1 or High" and outputs the second trigger signal to the speech recognition section 23.

After the first trigger signal is inputted, the speech recognition section 23 of FIG. 4 waits until the present-absent of opening of the mouth is changed from "absent" to "present" (Step S3 of FIG. 5). After the second trigger signal is additionally inputted, the speech recognition section 23 judges whether there existed a moment when the present-absent of the change in the view line (direction) of the eyes was "present" before the point in time (e.g., time t0 of FIG. 2) at which the present-absent of opening of the mouth was changed from "absent" to "present" (Step S4 of FIG. 5).

When there existed no moment at which the condition of the present-absent of the change in the view direction of the eyes was "present" before the time of change from "absent" to "present" (e.g., time t0 of FIG. 2) in the state of opening of the mouth, that is, when the condition of the present-absent of opening of the mouth was indicated "present" before the condition of the present-absent of the change in view direction of the eyes was indicated "present", the speech recognition section 23 starts speech recognition in accordance with the present-absent of opening of the mouth (e.g., from time t0 to time t1 of FIG. 2)(Step S5 of FIG. 5).

When there existed a moment at which the condition of the present-absent of the change in view direction of the eyes was indicated "present" before the time of change from "absent" to "present" (e.g., time t0 of FIG. 2) in the state of opening of the mouth, that is, when the condition of the present-absent of the change in view direction of the eyes was "present" before the present-absent of opening of the mouth was indicated "present", the speech recognition section 23 starts speech recognition in accordance with the present-absent of the change in view direction of the eyes and the present-absent of opening of the mouth (e.g., from speech duration is before time t0 to at least time t1 of FIG. 2)(Step S6 of FIG. 5).

When the speech recognition section 23 fails to show an error in the results of the speech recognition, that is, when the speech recognition section 23 can specify words or sentences from the phonems in the speech in accordance with the language model, those words or sentences are outputted to the processing section 25 of FIG. 4. The processing section 25 executes control commands (e.g., address search) in accordance with the words or sentences (Step 11 of FIG. 5). Specifically, the processing section 25 executes the control commands corresponding to the words or sentences which are specified in accordance with the language model (Step 11 of FIG. 5).

Alternatively, when the speech recognition section 23 encounters an error in the results of the speech recognition, that is, when the speech recognition section 23 is unable to specify words or sentences from among the phonems in the speech in accordance with the language model, the speech recognition section 23 generates a corrected first trigger signal and starts speech recognition (Step S7 of FIG. 5). Specifically, the speech recognition section 23 starts speech recognition from the time point which is a predetermined time backward from the time of change in the condition of opening of the mouth from "absent" to "present" (namely, from 2-3 seconds before time t0 of FIG. 2) (Step S8 of FIG. 5). Then, in Step S9 of FIG. 4, when the results of the speech recognition by the speech recognition section 23 continue indicating the error therein, the speech recognition section 23 broadens the range of performance of speech recognition relative to the phonems in the speech and then specifies words or sentences out of the recognized or estimated phonems in accordance with the language model Step S10 of FIG. 5). Thereafter, the processing section 25 executes the control commands (e.g., address search) in accordance with the words or sentences (Step S10 of FIG. 5). Specifically, after the target range of recognition of the phonems in the speech is broadened, the processing section 25 executes the control commands corresponding to the words or sentences which are specified in accordance with the language model, or the control commands similar to those of the words or sentences specified in the range before broadening (Step S11 of FIG. 5).

Note that the speech recognition section 23 may not use the second trigger signal but may use only the first trigger signal. When an error is shown in the results of the speech recognition by the speech recognition section 23 after utilization of the first trigger signal, the speech recognition section 23 of FIG. 4 may utilize only the corrected first trigger signal.

The sensor section 26 of FIG. 4 may be a GPS sensor that acquires the position of a vehicle, for example. The processing section 25 of FIG. 5 calculates a route from the position of the vehicle to, e.g., a set destination. The information storage section 28 of FIG. 4 stores, e.g., map information for utilization by the processing section 25. From the information storage section 28, the processing section 25 acquires map information of the area surrounding the position of the vehicle on the basis of the calculated route and the vehicle position and causes the acquired information to be displayed on the display section 27. The display section 27 may be a touch-panel-type display that allows touching by the driver to thereby operate the electrical equipment 31 (navigation system). That is, the display section 27 may have a function of a second operating section and is capable of storing operational information of outputting the same information to the processing section 25. Thus, the processing section 25 allows the driver to effect inputting into the second operating section with his finger and to carry out, e.g., an address search.

The present invention should not be construed as being limited to the exemplary embodiment described above. It will also be appreciated by a person skilled in the art that without departing from the scope of the appended claims obvious changes and modifications of the invention are available.

---

List of Reference Signs

11 . . . microphone;   12 . . . camera;   13 . . . video (image) storage section;
21 . . . audio storage section;   22 . . . trigger signal generation section;
23 . . . speech recognition section;   24 . . . operating section;
25 . . . processing section;   26 . . . sensor section;

-continued

List of Reference Signs

27 . . . display section; 28 . . . information storage section; 31 . . . electrical equipment; 100 . . . speech recognition device; P . . . feature point; t0 . . . time indicating start point of speech duration associated with the motion of a mouth; t1 . . . time indicating end point of speech duration associated with motion of mouth; te, ts . . . speech duration not associated with motion of mouth

The invention claimed is:

1. A system for recognizing speech, said system comprising:
a microcomputer comprising a trigger generation section and a speech recognition section;
the trigger generation section configured to generate a trigger signal based on at least a condition of present-absent of opening of a mouth; and
the speech recognition section configured to, in response to the trigger signal, receive audio signals and start speech recognition relative to the received audio signals,
wherein, when the trigger generation section generates the trigger signal based solely on the condition of present-absent of opening of the mouth, the trigger generation section generates the trigger signal for a predetermined time duration retroactively from a time point at which the condition of present-absent of opening of the mouth is present, and,
when the trigger generation section generates the trigger signal based on the condition of the present-absent of opening of the mouth and generates another trigger signal based on present-absent of a change in a view direction of eyes, and/or present-absent of a change in an orientation of a face, the trigger generation section generates the trigger signal and the another trigger signal when one of the present-absent conditions is present, and
when only the trigger signal based on the condition of the present-absent of opening of the mouth is generated, the speech recognition section utilizes the trigger signal as is, and when the another trigger signal based on the condition of the present-absent of the change in the view direction of eyes and/or the present-absent of the change in an orientation of the face is also generated, the speech recognition section utilizes the another trigger signal.

2. The speech recognition device of claim 1, wherein the speech recognition section is configured to perform the speech recognition based on the condition of present-absent of opening of the mouth, using the trigger signal in advance and, when an outcome of the speech recognition by the speech recognition section indicates an error, corrects the trigger signal, and the corrected trigger signal comprises a trigger signal that is generated for the predetermined duration of time retroactively from the time point at which the condition of present-absent of opening of the mouth is present.

3. The speech recognition device of claim 1, wherein the predetermined time is a period of 2-3 seconds.

4. A speech recognition device comprising:
a microcomputer configured to generate a trigger signal based on at least a condition of present-absent of opening of a mouth, and in response to the trigger signal, receive audio signals and start speech recognition relative to the received audio signals, wherein,
the microcomputer is further configured to generate another trigger signal based on present-absent of the change in a view direction of eyes and/or present-absent of the change in an orientation of the face,
when the trigger signal based on the condition of the present-absent of opening of the mouth and the another trigger signal based on the condition of present-absent of the change in the view direction of eyes and/or present-absent of the change in an orientation of the face are generated, the microcomputer is configured to start speech recognition using the another trigger signal, and
when an outcome of the speech recognition indicates an error, the microcomputer is configured to generate the trigger signal for a predetermined time duration retroactively from a time point at which the condition of present-absent of opening of the mouth is present, and restart the speech recognition with the trigger signal.

5. The speech recognition device of claim 4, wherein the predetermined time is a period of 2-3 seconds.

6. A computer-implemented speech recognition method comprising the steps of:
generating a trigger signal via a processor, said trigger signal based solely on motion of a first facial organ or based on the motion of the first facial organ and motion of a second facial organ different from the first facial organ; and
starting speech recognition relative to audio signals via the processor in response to the trigger signal,
wherein the first facial organ is a mouth, and
when only the trigger signal based on the motion of the first facial organ is generated, the trigger signal, as is, is utilized to start speech recognition, and when the trigger signal based on the motion of the second facial organ is also generated, the trigger signal based on the motion of the second facial organ is utilized to start the speech recognition.

7. The computer-implemented speech recognition method of claim 6, wherein the second facial organ comprises an eye and/or a face.

8. The computer-implemented speech recognition method of claim 7, wherein the motion of the mouth is present-absent of opening of the mouth, the motion of the eye is present-absent of a change in a view direction of the eye, and the motion of the face is present-absent of a change in an orientation of the face.

9. A computer-implemented speech recognition method comprising the steps of:
generating a trigger signal via a processor based on a condition of present-absent of motion of a mouth;
taking in audio signals via the processor in response to the trigger signal and starting speech recognition relative to the audio signals taken in,
wherein the trigger signal is generated from a predetermined time duration retroactively from a point in time at which the condition of present-absent of motion of the mouth is present, and
when only the trigger signal based on the condition of the present-absent of opening of the mouth is generated, the speech recognition is started using the trigger signals as is, and when another trigger signal based on a condition of present-absent of change in a view direction of eyes and/or present-absent of change in an orientation of a face is also generated, the speech recognition is started using the another trigger signal.

10. The computer-implemented speech recognition method of claim 9, wherein, when the speech recognition encounters an error, the trigger signal is generated for the predetermined time duration retroactively from the time point at which the condition of present-absent of motion of the mouth is present.

11. The computer-implemented speech recognition method of claim 9, wherein the predetermined time duration is a period of 2-3 seconds.

12. A computer-implemented speech recognition method comprising the steps of:

generating a trigger signal via a processor from a point in time at which a condition of present-absent of motion of a mouth is present;

taking in audio signals via the processor in response to the trigger signal and starting speech recognition relative to the audio signals taken in; and judging via the processor whether an outcome of the speech recognition indicates an error, wherein, when the trigger signal based on the condition of the present-absent of opening of the mouth and another trigger signal based on a condition of present-absent of change in a view direction of eyes and/or present-absent of change in an orientation of a face are generated, the speech recognition is started using the another trigger signal, and when the outcome of the speech recognition indicates an error, the trigger signal is generated for a predetermined time duration retroactively from a point in time at which the condition of present-absent of motion of the mouth is present, and the speech recognition is restarted in response to the trigger signal.

13. The computer-implemented speech recognition method of claim 12, wherein the predetermined time duration is a period of 2-3 seconds.

* * * * *